United States Patent [19]

King, Sr.

[11] Patent Number: 5,163,779
[45] Date of Patent: Nov. 17, 1992

[54] DRAIN APPARATUS

[76] Inventor: Lloyd H. King, Sr., 2909 S. Ocean Blvd. Apt., 6D, Highland Beach, Fla. 33487

[21] Appl. No.: 766,117

[22] Filed: Sep. 27, 1991

Related U.S. Application Data

[62] Division of Ser. No. 535,600, Jun. 11, 1990, Pat. No. 5,080,527.

[51] Int. Cl.⁵ .................. F16K 15/14; E03B 7/08
[52] U.S. Cl. ........................ 405/36; 137/107; 137/236.1; 137/512.4; 137/843; 251/368
[58] Field of Search ............ 137/236.1, 512.4, 516.25, 137/516.27, 517, 550, 843, 107, 269, 512, 512.15; 251/145, 368; 405/36, 37, 39, 43, 44

[56] References Cited

U.S. PATENT DOCUMENTS

| | | | |
|---|---|---|---|
| 218,024 | 7/1879 | Hennessy et al. | 137/517 X |
| 3,143,135 | 8/1964 | Cornelius | 137/517 X |
| 3,456,683 | 7/1969 | Roulet et al. | 137/843 X |
| 3,779,276 | 12/1973 | King | 405/39 X |
| 3,999,570 | 12/1976 | Clements | 251/145 X |
| 4,244,378 | 1/1981 | Brignola | 137/843 X |
| 4,890,640 | 1/1990 | King | 137/512.4 |

Primary Examiner—Randolph A. Reese
Assistant Examiner—John Ricci
Attorney, Agent, or Firm—Jacobson & Johnson

[57] ABSTRACT

A drain valve modifiable for use under different water pressures by merely changing the material of valve member within the drain valve. The drain valves are used in a fluid system to produce a fluid system that respond to local water pressure conditions. In one embodiment the drain valves include an extended inlet port that project into the water supply line to prevent complete drainage of the irrigation system and thus conserve water from one watering cycle to the next. Another embodiment of the drain valve includes multiple resilient members for sequence action in opening and closing of the drain valve. Still another embodiment permits a user to change the size of the drain passage by placing an insert in the drain passage of the drain valve.

4 Claims, 3 Drawing Sheets

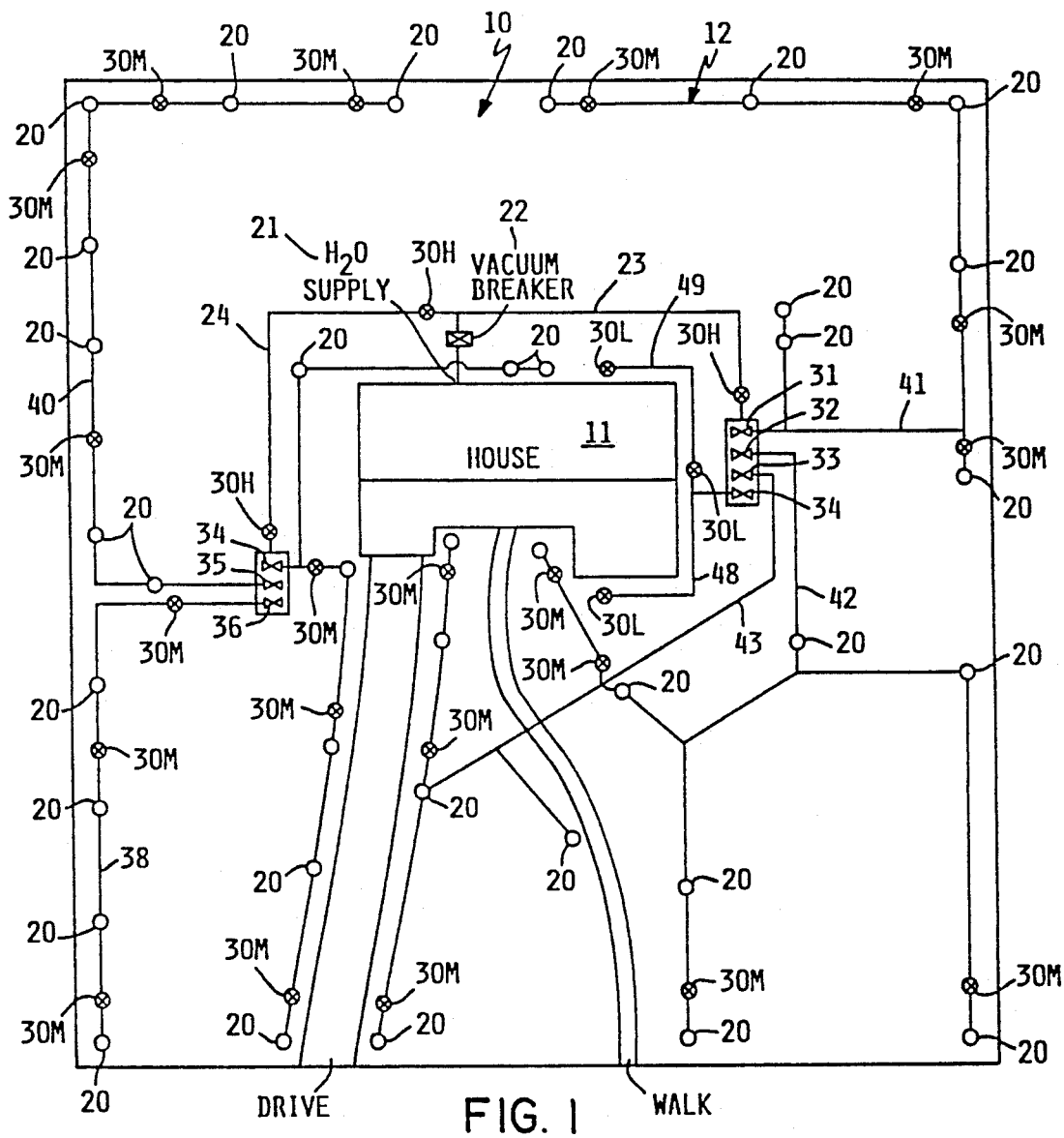
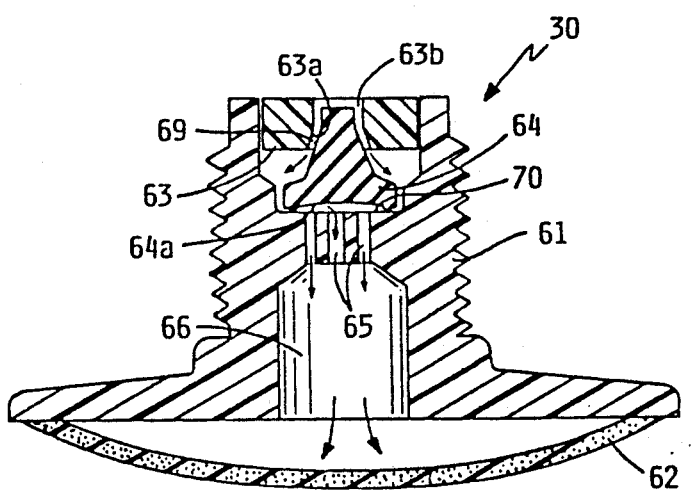
FIG. 1
FIG. 2

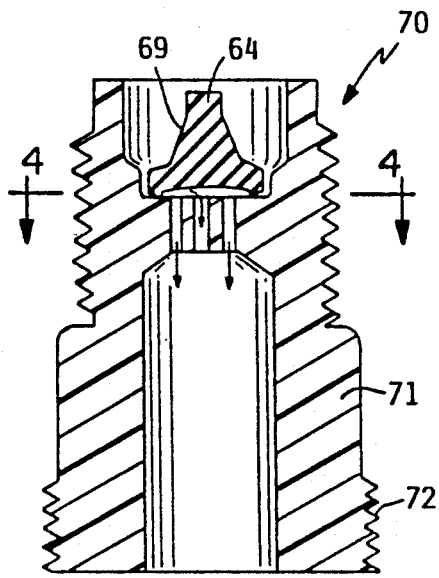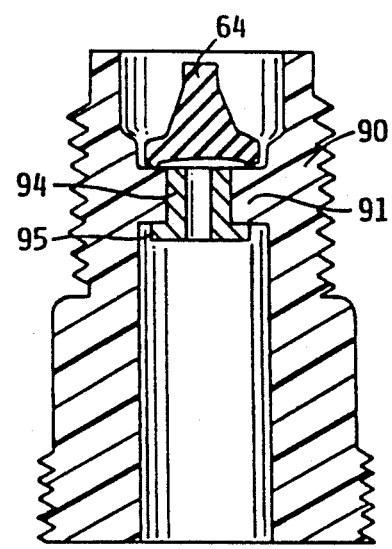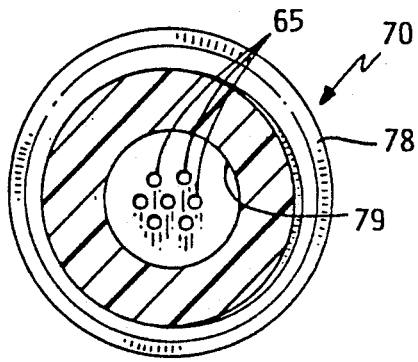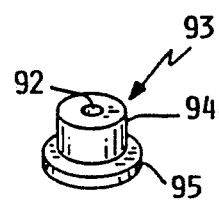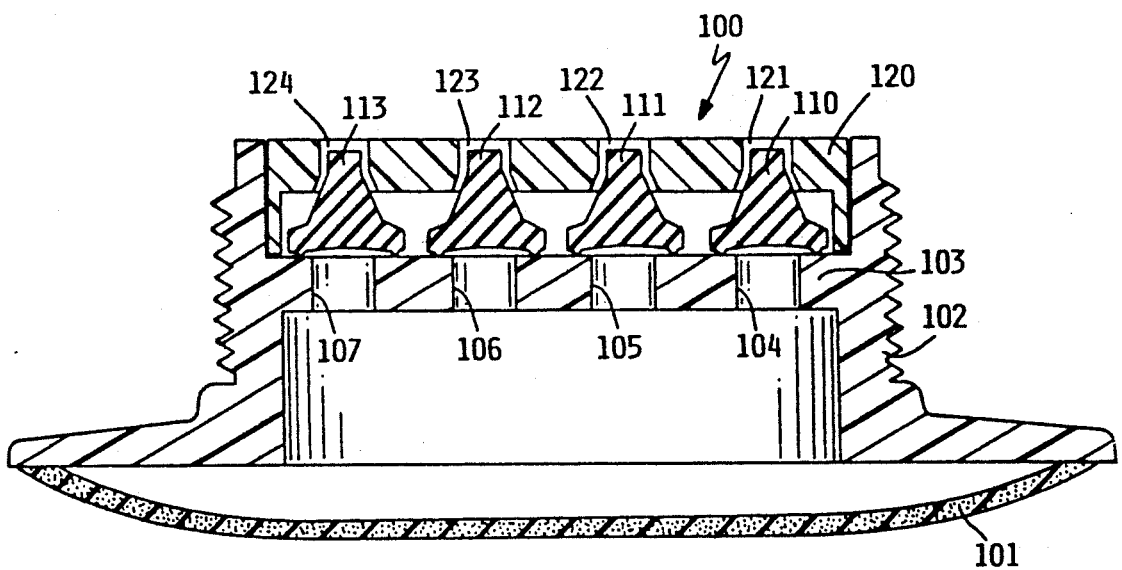

DRAIN APPARATUS

This application is a division of application Ser. No. 07/535,600, filed Jun. 11, 1990, now U.S. Pat. No. 5,080,527.

BACKGROUND OF THE INVENTION

1. Field of the Invention

This invention generally relates to drain valves and drain valve systems for use in water supply systems requiring periodic purging of the water supply systems.

2. Description of Prior Art

Generally underground watering systems with drain valves that automatically drain the water from underground water supply pipes to prevent freezing and rupture of the water supply pipes are well known in the art. My U.S. Pat. No. 3,779,276 shows one such drain valve. The drain valve includes a resilient valve member which prevents water from escaping from the underground water system under high water pressures but opens as the water pressure decreases to permit the water in the underground water lines to drain into the surrounding soil.

My U.S. Pat. No. 4,890,640 shows another type of drain valve having a non-extrudable sealing member. This valve is well-suited in locations where pressure surges occur in the water supply line, since the drain valve contains a valve member that is non-extrudable in relation to the discharge opening. Consequently, the drain valve continues to function normally even though high-pressure surges occur which could normally blow out other valve members.

The present invention comprises an improvement over U.S. Pat. No. 3,779,276 by providing a family of drain valves which can be made to operate under different pressures by changing the internal valve member of the drain valve.

One feature of the invention is a drainage system that conserves water by retaining a portion of the water in the underground water lines.

A further feature of the invention is a field modifiable drain valve which can be set to operate under various field conditions.

Still another feature of the invention is a water drainage system having at least two drain valves responsive to different operating pressures to accommodate the different water pressures at different locations in the watering system.

BRIEF SUMMARY OF THE INVENTION

Briefly, the present invention includes a drain valve modifiable for use under different water pressures by merely changing the material of valve member within the drain valve. The drain valves that respond to local water pressure conditions ensures proper functioning of the drain valve in response to the local water pressure. In addition in one embodiment the drain valves include an extended screened inlet port that project into the water supply line to prevent complete drainage of the irrigation system and thus conserve water from one watering cycle to the next.

BRIEF DESCRIPTION OF THE DRAWING

FIG. 1 shows a partial schematic view of a house with an irrigation system located around the house;

FIG. 2 is a sectional view of one embodiment of my invention in the drain mode;

FIG. 3 shows an sectional view of an alternate embodiment of my invention in the drain mode;

FIG. 4 is a top view taken along lines 4—4 of FIG. 3;

FIG. 5 is a partial sectional view of an alternate embodiment of my drain valve;

FIG. 6 shows an insert from my drain valve to control the outlet drain area;

FIG. 7 shows an alternate embodiment of my invention for use in large-volume water systems;

DESCRIPTION OF THE PREFERRED EMBODIMENT

Figure 8:
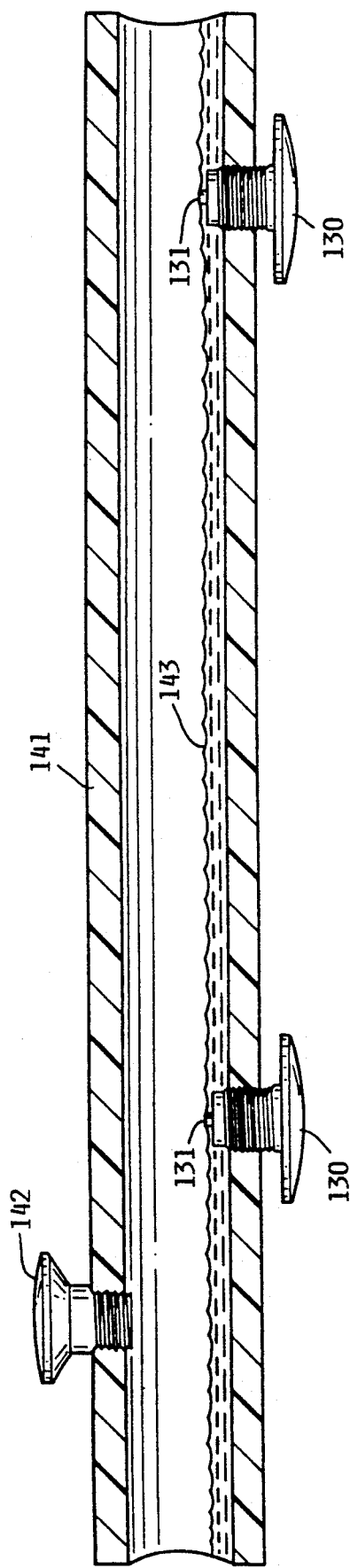
FIG. 8 shows a partial cutaway view of a water conservation system.

Referring to FIG. 1 reference numeral 10 generally identifies a lawn surrounding a house 11. Connected to the water supply of house 11 is an underground irrigation system 12 having a plurality of sprinkler heads identified by reference numeral 20. The sprinkler heads are known in the art and comprise a general circular member with a plurality of holes to discharge water to the lawn area surrounding the sprinkler head.

Irrigation system 12 generally comprises three different pressure regions a high-pressure region, an intermediate-pressure region and a low-pressure region. In general the water pressure in the water lines decreases as the water flows through the water lines and is diverted from the water lines to irrigate the lawn. Typically one may have a water pressure of 120 psi at the inlet to the irrigation system and only 10 to 15 psi at remote portions of the irrigation system.

House 11 includes a high pressure water supply 21 which directs high pressure water to a vacuum breaker valve 22. Water from vacuum breaker valve 22 flows into primary high pressure water supply pipes 23 and 24. Water supply pipe 23 directs high pressure water to three remotely controlled electric solenoid valves 31, 32, 33 and 34. Similarly, water pipe 24 directs high pressure water to three remotely controlled electric solenoid valves 34, 35 and 36. Connected to water supply lines 23 and 24 are three high pressure drain valves identified by reference number 30H. High pressure drain valves 30H are located in a portion of the water supply line closest to the source that generally contains the highest water pressure in the irrigation system.

Connected to solenoid valve 35 is a secondary water line 40 that contains a number of sprinkler heads 20 and four underground drain valves 30M. The secondary waterline contains intermediate water pressures that are generally less than the water pressure in primary water lines 23 and 24. Reference numerals 38, 39, 40, 41 and 42 identify similar secondary water lines wherein the water pressure is generally less than the water pressure in water lines 23 and 24.

Connected to solenoid valve 34 is a tertiary low pressure drip irrigation system having a first pipe line 48 and a second pipe line 49. Typically drip irrigation systems contain restrictions to reduce the water pressure to permit slow irrigation of area such as shrubs or bushes around the house. While a drip irrigation system can be used to irrigate selected areas one can also use sprinkler heads that operate with low water pressures. In general, the water pressure in tertiary lines 48 and 49 is considered low relative to the water pressure in the primary and the secondary water lines. Connected to the low pressure tertiary lines 48 and 49 are three low pressure drain valves 30L that permits one to drain water from the low-pressure underground lines 38 and 49.

The irrigation system shown in FIG. 1 comprises three zones of different water pressure: a primary high pressure zone proximate to the water supply, a secondary intermediate-pressure zone extending outward from the primary high pressure zone and a third low-pressure zone. The pressure in each zone is an inherent function of the line loses as water flows through the lines as well as an effect of continually diverting water from the water lines. Also if the irrigation system is located on a hill the variation in the location of the water lines can produce pressure differences in the water lines. One of the difficulties with complicated underground watering systems is that if the variation in water pressure within the water lines is extreme one set of drain valves may not properly work with the underground water system. For example, the water line pressure in the underground water line systems 23 and 24 may be 120 psi, the water line pressure in the secondary lines may be 60 psi, and the water pressure in the tertiary lines may have water pressure of 10 to 15 psi. To have an underground water system that closes the drain valves as the water pressure increases and opens the drain valves as the water pressure decreases one should match the drain valve operating pressures to the local water pressures in the underground water system. The present invention provides drain valves for use in each of the three or more pressure zones of the irrigation system of FIG. 1.

Figure 10:
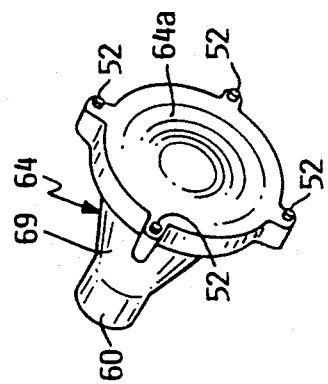
FIG. 10 shows the valve member or resilient plug used in the drain valve.

FIG. 2 illustrates a preferred embodiment of drain valve 30 that operates under different line pressures. Drain valve 30 includes a housing 61 having a drain pad 62 located beneath housing 61. Drain pad 62 disperses water from the water line to the surrounding subsoil. Located in the upper portion of housing 61 is a resilient plug 64 forming a resilient two-way valve member which has a top conical portion 69 that seals against an annular seat 63a on one end of top member 63. Located on the opposite end of member 64 is a lower sealing surface 64a that seals against a seat 70 having a plurality of discharge openings 64B located therein. Resilient plug 64 is shown in greater detail in FIG. 10. Resilient plug 64 includes resilient nipples 52, neck 60, and retaining end 65 which has an end surface 64a that abuts against support surface 70 resilient plug 64 and the resilient nipples 52 are known in the art and do not constitute a novel part of this invention. Other types of resilient plugs or valve members suitable for use in my invention are shown in U.S. Pat. No. 4,890,640.

Extending from surface 70 and into region 66 are a plurality of drain openings 65 which permit water to flow around member 64 when it is in the relaxed condition as shown in FIG. 2. In general, member 64 comprises a resilient material such as rubber, flexible PVC or SANTOPRENE or the like. The inherent resiliency of the material forming member 64 permits member 64 to move in response to the water pressure in the drain valve. That is, under high-water pressure at the inlet 63b, member 64 seals the drain openings 65 thereby preventing water from draining into the soil surrounding drain valve 30. When the pressure is removed from the water line, the resiliency of member 64 causes member 64 to move upward to the position shown and allow water to drain around member 64 and into the subsoil surrounding drain pad 62. In the preferred embodiment member 64 is made of a material that is about the same specific gravity as the fluid being directed through valve 30. If member 64 floats then any fluid attempting to flow back into the water lines will be sealed off from the drain lines by member 64 seating and sealing against upper seat 63a.

One feature of the present invention is the creation of a family of drain valves that can open and close under different water pressures to permit the irrigation installer to match the operating pressures of the drain valve to the local pressures in the water lines. For example, adding additional sprinklers in a specific zone can create a different operating pressure in that zone. By matching the operating pressures of the drain valve to the local water pressures the installer insures that the system operates properly. For example, in a typical system that has an extended irrigation system the pressure at the end of the water line may never get above 10 psi. If the water pressure never gets above 10 psi one should have a drain valve that closes at less than 10 psi. Yet the primary pressure zone of the irrigation systems may require a drain valve that closes at 40 psi. Obviously, a drain valve that closes at 40 psi would not be useable in the portion of the system where the pressure does not exceed 10 psi. In order to have the drain valves close as the water begins to flow through the pipes the drain valves in the secondary and tertiary zones should have drain valves that are more sensitive to lower closing pressures.

A method for installing drain valves in an irrigation system having zones of high and low pressure includes the step of determining the primary high pressure region and the secondary low pressure region of the irrigation system. A user then attaches a drain valve responsive to high pressure to the high pressure region of the irrigation system. In order to permit the installer to readily identify where the drain is to be located a visual indication such as a colored drain valve housing allow an installer to quickly identify that the drain valve should be located in said high pressure region. The user then attaches a different drain valve responsive to low pressure to the low pressure region of the irrigation system. In order to permit the installer to readily identify where the low pressure drain valve is to be located a visual indication such as a different colored drain valve housing allow an installer to quickly identify that the drain valve should be located in the low pressure region.

While only two pressure regions are describe it is apparent that if desired one can break the irrigation pressure zones into multiple zones of different pressures and use multiple drain valves. For example, four differently colored drain valves each responsive to five different pressures can be used in an irrigation system. One may use an orange drain valve for the main high pressure line, a green drain valve for a lower pressure lateral line, a yellow drain valve for placing next to solenoid valves of the irrigation system, and a blue valve to place under sprinkler heads in the irrigation. With the drains continuing visual indicators such as colored housing it permits the installer to quickly install the drains in their proper location.

The present invention provides for modification of known drain valves to create a family of identical appearing drain valves that are only distinguishable by visual indicators incorporated into the drain valve. That is, drain valves 30 substantially identical except for resilient plug or member 64. I have found that I can create a family of drain valves for use through the watering system by only changing the durometer of member 64. By changing the durometer or the hardness of member 64 I have been able to create a family of drain valves to operate under different pressures. The below-listed table indicates the average operating pressures and average durometers of resilient plug 64 for identical drain valve housings.

| VALVE DUROMETER | CLOSING PRESSURES | | | OPENING PRESSURES | |
|---|---|---|---|---|---|
| | 70% CLOSED | 90% CLOSED | 100% CLOSED | 10% OPEN | 100% OPEN |
| 40 | | 3 psi | 5.5 psi | 5 psi | 3 psi |
| 50 | 6.5 psi | 10 psi | 11 psi | 10 psi | 4.75 psi |
| 60 | 8 psi | 11 psi | 16 psi | 14.5 psi | 6 psi |
| 70 | 9 psi | | 20 psi | 15 psi | 7 psi |
| 80 | 17 psi | | 40 psi | 30 psi | 11 psi |

The table shows that if drain valve 30 is fitted with a sealing member 64 having a durometer of 40 the drain valve is approximately 90 percent closed at about 3 psi and is 100 percent closed at about 5.5 psi. When the same drain valve 30 is fitted with a sealing member having a durometer of approximately 80 the drain valves is approximately 70 percent closed at 17 psi and is 100 percent closed at 40 psi. Consequently, the changing of the durometer of sealing member 64 changes the operable range of closing pressure of the drain valve.

In addition to changing the closing pressure, the pressures at which the valve opens to drain water into the surrounding subsoil also changes with a change in the durometer of sealing member 64. Note if drain valve 30 had a two way sealing member 64 with a durometer of 40 the drain valve starts to open when the pressure decreases to approximately 5 psi and is fully open when the pressure is less than approximately 3 psi. Similarly, when drain valve 30 has a sealing member of a durometer of approximately 80, the drain valve begins to open as the pressure decreases to approximately 30 psi and is fully open when the pressure decreases to approximately 11 psi. The above table showing opening and closing pressures are approximate average values of pressures and are provided as guidance to show the relative difference of operating pressures one can produce a family of valves by only changing the durometer of the resilient sealing member 64. Consequently, one can use the identical housing for each drain valve and install the proper sealing member 64 to produce a drain valve that operates properly in the normal pressure ranges.

Referring to FIG. 3 reference numeral 70 shows an alternate embodiment of a drain valve that is similar to drain valve 30, except instead of having a drain pad, it includes a lower housing 71 with threads 72 for attachment to a sump line. Since use of drain valve 70 with a sump may now require the drain valve to prevent backflow drain valve 70 contains a one-way valve that does not prevent back flow.

FIG. 4 shows a top view of drain valve 70, showing drain opening 65 spaced in top member 78. Illustrated by dotted lines is the normal position of the exterior cylindrical portion of sealing member 64. Reference numeral 79 indicates the cylindrical side wall of the drain valve that confines member 64 from lateral movement. Note, in any lateral position of valve member 64 the exterior cylindrical surface of member 64 are over drain openings 65. That is drain holes 65 are spaced sufficiently inward from the exterior so that a portion of resilient valve member 64 always covers the openings regardless of the lateral position of valve member 64.

FIG. 5 shows an alternate embodiment of the invention which includes a valve housing 90 having a resilient sealing member 64 therein. Housing 90 has a member 91 extending across valve housing 90 with an opening 92 having an insert 93 fitted therein. The purpose of insert 93 is to reduce the diameter of the drain passage of an existing drain valve. Insert 93 is shown in greater detail in FIG. 6 and comprises a first cylindrical section 94 and a second cylindrical head section 95. Extending completely through both cylindrical head sections is an opening 92. Insert 93 permits a user to adjust the size of the drain holes in the valve by merely inserting one or more inserts into the drain valve. That is, member 93 may be made from a polymer plastic and can be fastened into an opening 92 in drain valve 90 with a solvent cement or the like. Thus an operator can adjust the size of the drain passage by merely placing an insert into the housing 90. If desired the operator can place the insert 93 in from the top to allow a field user to change the drain passage area.

Referring to FIG. 7 reference number 100 generally identifies an alternate embodiment of my drain valves for use in areas where large volumes of water may be drained or discharged from a water line. Drain valve 100 includes a drain pad 101, a housing 102, a lower multiple seat 103, having a plurality of drain passage openings 104, 105, 106 and 107. Located directly above opening 104 is a first resilient valve member 110. Located directly above opening 105 is a second resilient valve member 111, located above opening 106 is a third valve member 112 and located above opening 107 is a fourth valve member 113.

Extending across the top of housing 102 is a top seat 120 which has a set of openings 121, 122, 123 and 124. The resilient valve members 110, 111, 112 and 113 are identical in size and shape and operate in the same manner as the resilient valve member of FIG. 2. However, instead of having only one resilient member in the housing, the present invention has multiple resilient valve members.

A feature of the embodiment shown in FIG. 7 is that the valve can be made tuned more precisely for high and low pressure openings and closings where large volumes of water are discharged. For example, if one wants a drain valve to begin closing at a low pressure so the water pressure can begin to build up in the system one or more of the resilient valve members can be made of sufficient duromoter to open and close with pressures as low as 3 to 5 psi while the remaining resilient valve members can be made of different material that allows the valve 100 close at pressures of 17 to 40 psi. Consequently, by using resilient valve members of different hardness one can produce produce a sequencing effect where drain passages continue to close as the pressure increases or the drain passages begin to open as the pressure decreases.

Figure 9:
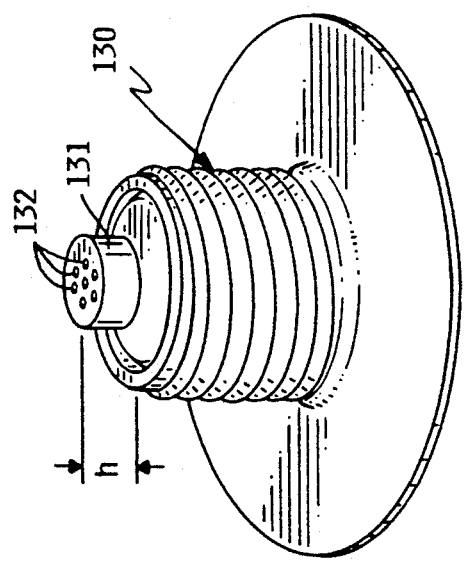
FIG. 9 shows a drain valve with an extended screened inlet port for use in a water conservation irrigation system.

FIGS. 8 and 9 show an alternate embodiment of my system for conservation of water in the drain lines. One of the problems with irrigation, particularly in climates with limited water supplies, is that the water should not be unnecessarily wasted. Since the underground water lines contain substantial amounts of water, it would be desirable if some of the water could be retained in the water lines, yet one does not want to retain sufficient water in the lines so that if freezing occurs, the underground lines rupture and break. For example a ¾ inch irrigation system may require any where from 10 to 20 gallons of water to fill the underground water lines. If only half of the water was drained from the underground irrigation lines each time the lawn was irrigated there would be a saving of 5 to 10 gallons of water each time the irrigation system is used.

The present invention provides an underground drain valve 130. Drain valve 130 is identical to drain valve 30 except drain valve 130 has an upwardly extending neck 131 with an inlet port having a series of openings 132 to permit water to enter drain valve 130. To illustrate how drain valve 130 operates to conserve water and yet prevent freezing, refer to FIG. 8. A first drain valve 130 and a second drain valve 130 are attached to opposite ends of an underground water line 141 having a spray head 142. Underground water line 141 could be a portion of any the underground lines shown in FIG. 1. The water level in the line 141 is indicated by reference numeral 143. Note that the water drains to the top surface of each drain valve inlet port 132 and remains in the underground line 141 since the water can not flow upward and through the openings 132. Thus by controlling the height H that the extension 131 extends into the underground water system, one can generally control the amount of water left in the water line. Preferably, one would leave about one-half of the water in the line using underground drain valves 130. A further feature of having a screen located over the inlet to the drain valve that is spaced sufficiently far into the water supply pipe so that the water flowing past the screen produces a cleaning action on the screen to remove particles deposited on the screen.

While my drain valve is shown in use for underground watering systems my drain valve can also be use as a flush valve at the end of an underground watering system. Other applications of my drain valve are as a boat drain valve, an air compressor drain valve, an overhead fire sprinkler drain, or as a drain valve for a heating and cooling condensers.

I claim:

1. A method for installing drain valves in an underground irrigation system having zones of different pressure supplied from a common source comprising the steps of:

determining a primary high pressure zone of an irrigation system supplied from a common source wherein the irrigation system includes a first irrigation pipe for supplying water to a first area to be irrigated with the first irrigation pipe being under a high pressure from the common source;

determining a secondary low pressure zone of the irrigation system supplied from the common source wherein the irrigation system includes a second irrigation pipe for supplying water to a second area to be irrigated with the second irrigation pipe being under a high pressure from the common source;

attaching a first drain valve responsive to opening and closing at a first pressure to the first irrigation pipe in the high pressure zone of the irrigation system to permit operation of said first drain valve from the pressures generated at the common source, said first drain valve having a visual indicator to allow an installer to position said first drain valve in said high pressure zone of the irrigation system;

attaching a second drain valve responsive to opening and closing at a second pressure to the second irrigation pipe in the second pressure zone of the irrigation system to permit operation of said second drain valve from the pressures generated at the common source, said second drain valve having a visual indicator to allow an installer to position said second drain valve in said low pressure zone and not in said high pressure zone so that said first drain valve responsive to a first pressure and said second drain valve responsive to a second pressure are operable from the common source; and burying the first and second drain valves and said first and second irrigation pipes to thereby produce an underground irrigation system.

2. A freeze proof below ground irrigation system for periodic irrigating an area and for conserving water comprising:

a water line for supplying water to an area, said water line extending horizontally beneath an area of soil to be irrigated, said water line having a top and a bottom;

means attached to said water line for irrigating an area around said means;

a first drain valve for draining the water from said water line to prevent the water from freezing and rupturing said water line, said first drain valve including a first drain passage to drain said first drain valve, said first drain valve including first means for forming sealing and supporting engagement within said first drain valve to permit said first means to seal said first drain passage when the water pressure in said first drain valve increases to a first pressure, said first drain valve having a first upwardly extending neck with a first top section having a first inlet port to permit water to drain through said first drain valve when the water pressure to said water line is shut off, said first neck extending into said water line sufficiently far to retain and thereby conserve a portion of the water in said water line by preventing the water located below the top of said first inlet port from draining through said first drain valve; and a second drain valve for draining the water from said water line to prevent the water from freezing and rupturing said water line, said second drain valve including second means for forming sealing and supporting engagement with said second drain valve to permit said second means to seal said second drain passage when the water pressure in said second drain valve increases to a second pressure, said second drain valve having a second upwardly extending neck with a second top section having a second inlet port to permit water to drain through said second drain valve when the water pressure to said water line is shut off, said first neck and said second neck extending into said water line sufficiently far to conserve a portion of the water in said water line by preventing the water located below the top of said second inlet port from draining through either said first drain valve or said second drain valve, said first inlet port and said second inlet port spaced sufficiently far from the top of said water line to permit sufficient water to drain from said water line through either of said first drain valve or said second drain valve so that if the remaining water left in said line freezes it does not rupture said water line.

3. The freeze proof irrigation system of claim 2 wherein said first inlet port includes a screen and said second inlet port includes a screen and extends the same distance into said water line so that the water level in said line remains at the top of said first inlet port and said second inlet port.

4. The freeze proof irrigation system of claim 2 wherein said first means in said first drain valve includes a first resilient plug to seal said drain valve, said first resilient plug having a first hardness to permit opening at a second pressure and said second means in said second drain valve includes a second resilient plug to seal said second drain valve, said second resilient plug having a second hardness different from said first hardness to permit opening said second drain valve at a third pressure where said third pressure is different from said second pressure.

* * * * *